Aug. 20, 1940.   H. G. MOJONNIER   2,212,275
APPARATUS FOR TREATING FLUIDS
Filed March 14, 1938   3 Sheets-Sheet 1
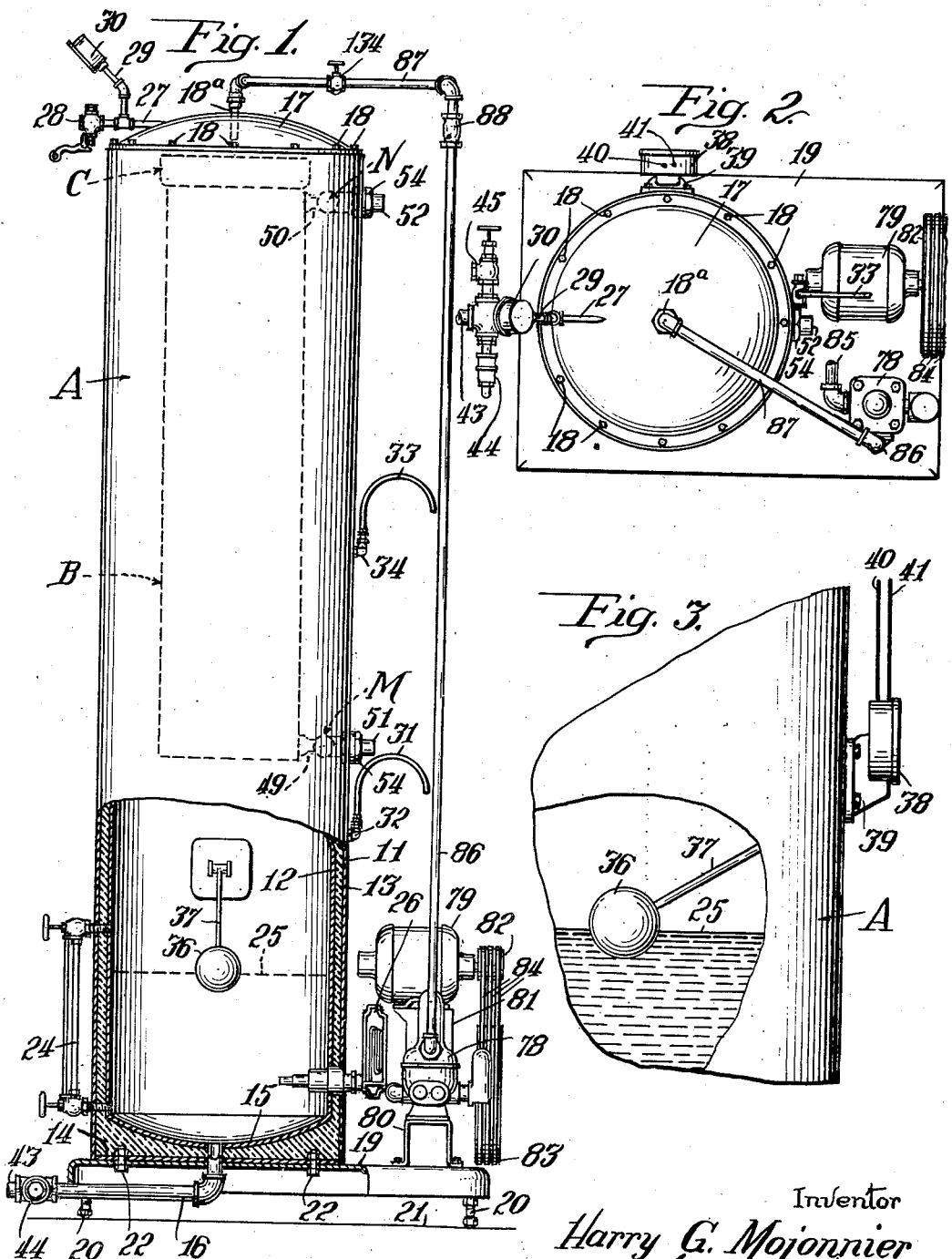
Inventor
Harry G. Mojonnier
By Thomas H. Ferguson
Attorney.

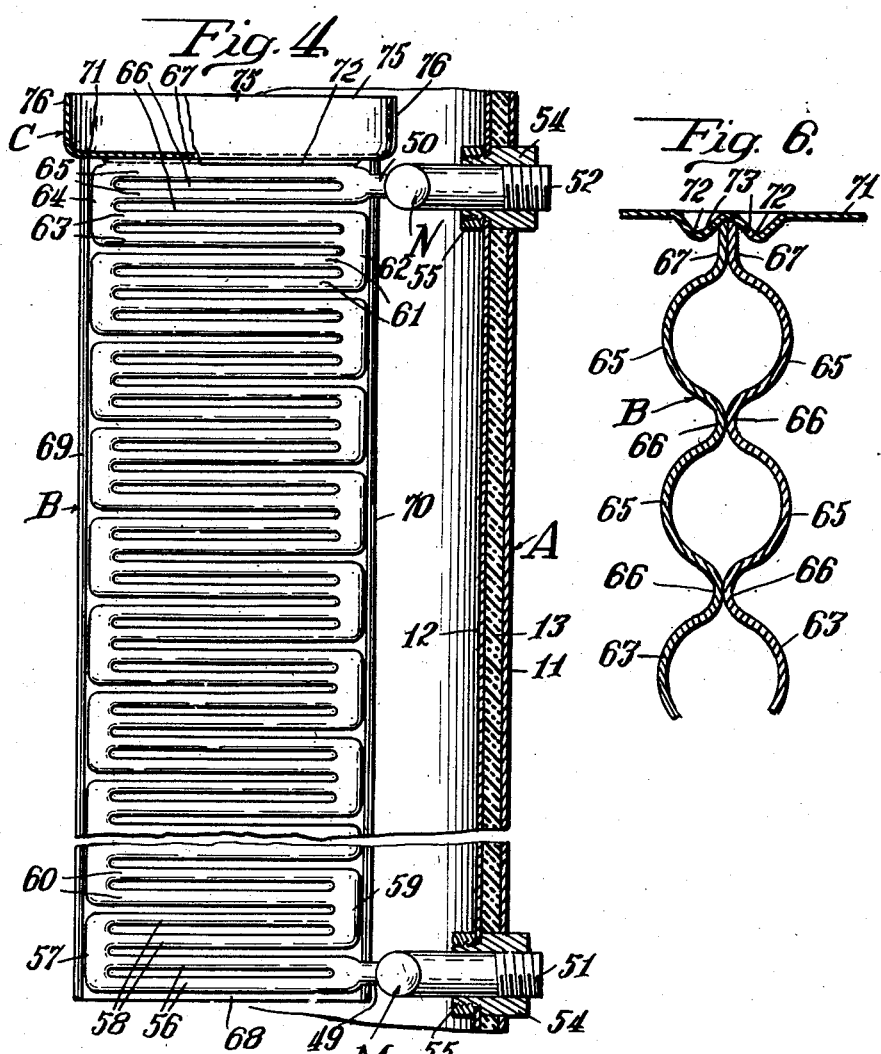
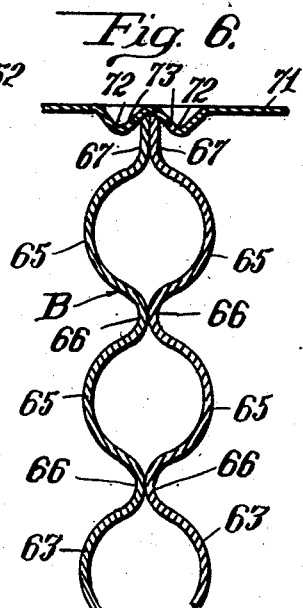
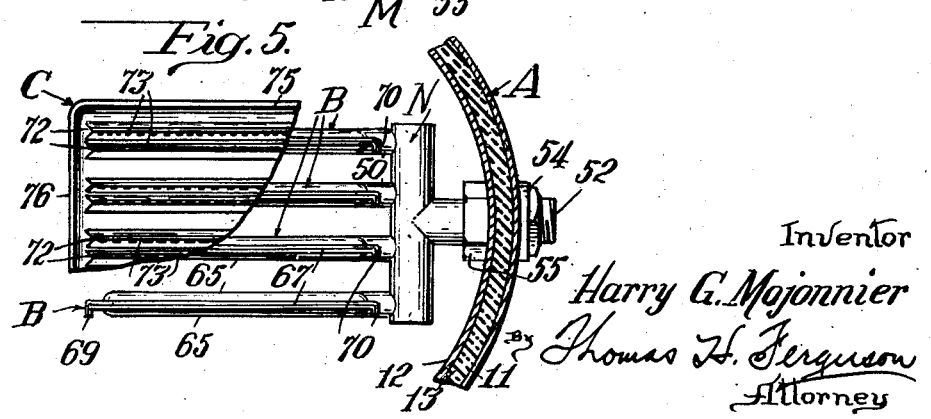

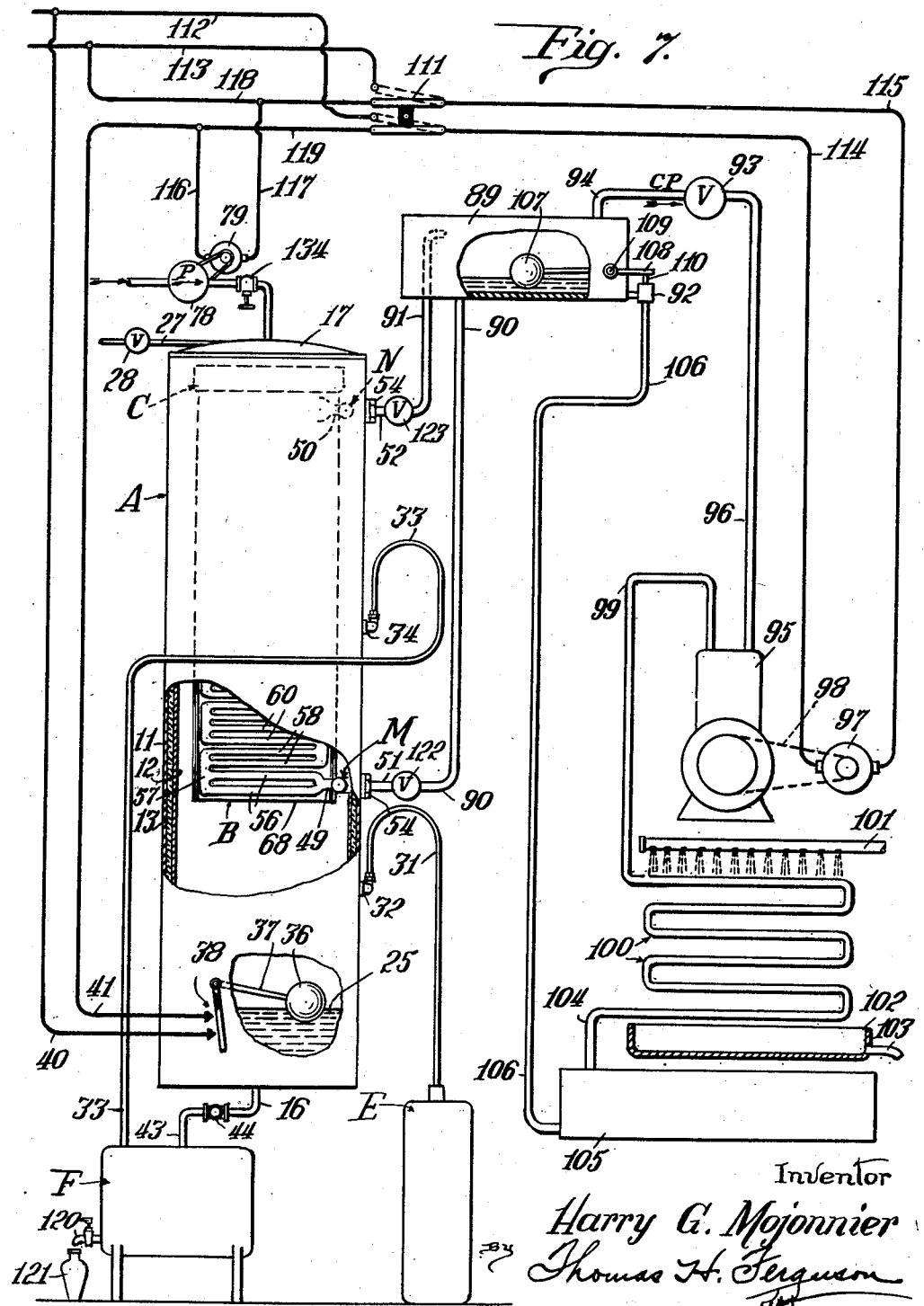

Patented Aug. 20, 1940

2,212,275

UNITED STATES PATENT OFFICE 2,212,275

APPARATUS FOR TREATING FLUIDS

Harry G. Mojonnier, Oak Park, Ill., assignor to Mojonnier Bros. Co., a corporation of Illinois Application March 14, 1938, Serial No. 195,743

2 Claims. (Cl. 261—11)

The present invention relates to apparatus for treating fluids. It has in view a novel structure by which the treating elements are bound together into a unit and in which the elements are readily accessible for cleaning.

The various features of the invention will be best understood upon reference to the following detailed description taken in connection with the accompanying drawings while the scope of the invention will be particularly pointed out in the appended claims.

In said drawings, Fig. 1 is a side elevation of an apparatus constructed and arranged in accordance with the present invention, a portion of the tank of the apparatus being shown in a central vertical section. Fig. 2 is a plan view of the same apparatus. Fig. 3 is a fragmentary view of a portion of the tank of the apparatus illustrating particularly a float controlled electric switch. Fig. 4 is a side elevation of the treating elements located in the tank, in conjunction with a portion of the supporting tank wall, shown in section. Fig. 5 is a plan view of the structure of Fig. 4 wherein the treating elements are shown in association with a distributor which is partly broken away. Fig. 6 is a detailed view illustrating in section the way in which the upper end of one of the treating elements of the structure of Fig. 4 fits into and cooperates with the bottom of the distributor, and Fig. 7 is a diagram of a system in which the new apparatus is employed in cooling and carbonating water at the same time. Throughout these views like characters refer to like parts.

As indicated, the new apparatus may be variously constructed and still come within the scope of the invention. In the embodiment illustrated, there is a pressure tank A in which the treating actions occur. Within the tank A are one or more treating elements. These may differ among themselves but preferably take the form of heat exchange elements B. If heat is to be added to or subtracted from the liquids being treated, then these elements are supplied with a heat exchange medium but if no heat is to be transferred, these same elements B may be used without supplying them with a heat exchange medium. In the case of all of these elements, whenever a liquid is fed to them for treatment, it is fed so as to flow over their outer surfaces and the latter are so formed that the flow will be in thin evenly distributed films. Where an impregnating gas is supplied to the interior of the tank, then, because of the film-like streams, the gas obtains good access to all parts of the liquid. The latter, after being treated by the gas, falls into a collecting basin at the bottom of the tank.

The pressure tank A may take different forms, but, preferably, it is an upright tank having an outer shell 11 and an inner shell 12, which shells, together with intervening heat insulation 13, form the peripheral wall of the tank. At the bottom the outer shell 11 is welded to a circular plate 14, while the inner shell 12 is similarly attached to an arcuate bottom plate 15. The latter is dished as shown, and thus provides a low center point, from which the outlet pipe connection 16 extends. The top 17 of the tank is preferably composed of a single dished plate which is secured at its periphery by bolts or screws 18 to the top of the wall of the structure. An inlet pipe 18a is passed through the center of the top or head 17, and extends a short distance within the tank.

The tank A, as thus made up, is mounted on a flanged base plate 19, which is provided with adjustable legs 20 so that it may be properly seated on a floor, or other like surface, 21. Preferably, the bottom plate 14 of the tank is secured to the base plate 19 by bolts and nuts, or rivets, 22, of sufficient number to hold the tank firmly in position upon its base.

A water gage 24 is located near the lower end of the tank, and communicates with its interior, so as to show the level of the liquid which has accumulated in the tank. In the present instance a liquid level is indicated by the line 25.

At a low point, a thermostat 26 is connected to the tank, and placed in communication with its interior so as to show the temperature of the liquid within the lower portion of the tank. As before noted, the lower portion of the tank constitutes a collecting basin from which the liquid may be withdrawn through the pipe 16 under suitable control. The liquid collected in the bottom of the tank A, under the assumption that we are to use the apparatus for the carbonating of water, will be carbonated water.

At the top of the tank is a pipe 27 which leads to a blowoff valve 28, and is connected by a branch pipe 29 with a pressure indicator 30.

When the valve 28 is in closed position, the indicator 30 will show the pressure of the gases within the tank A. In the manufacture of carbonated water, air and light gases will accumulate in the top of the tank, from time to time, and by means of the valve 28, the same may be discharged to atmosphere.

The carbon dioxide gas which is supplied to the tank is received through a small connecting pipe 31 which communicates at the point 32 with the interior of the tank. A similar small pipe 33, similarly communicating with the tank at 34, leads from the tank to a filler or other like apparatus F, in some portion of which gas under pressure is required for its operation. This may be an equality of pressure, or pressures bearing a different ratio. Where such pressure is not required in the adjunctive device, then the pipe 33 may be removed or otherwise rendered functionless. Where removed, the opening at 34 may be closed by a screw-plug or the like.

The float controlled switch within the lower portion of the tank A, comprises a float 36 which rides upon the liquid, and which, through a supporting arm 37, operates an electric switch 38, having a suitable bracket 39 by which it is secured to the wall of the tank. The switch 38 is preferably a Mercoid switch, although the desired functions may be realized in structures wherein mercury is not the interconnecting element. As illustrative of both kinds of float controlled switches, see the following United States Patents: No. 361,968, Olsen, dated April 26, 1887; No. 431,885, Focer, dated July 8, 1890; Reissue No. 20,380, Hickstein et al., dated May 25, 1937. From the switch 38, conductors 40 and 41 extend through a conduit, or otherwise, to points where the same are connected into circuit with other control apparatus, as will be pointed out more fully hereinafter.

Preferably, the outlet pipe 16 is provided with an extension pipe 43 which runs to the filler, or other apparatus F, which is to be supplied with the carbonated water. Preferably, also, in association with the pipes 16 and 43 are two valves, one a relief valve 44 and the other a drain-out valve 45.

As before stated, elements B are the heat exchange elements which are preferably used. They are mounted within the tank A near its upper end and are furnished with suitable connections for admitting and discharging a refrigerant.

The elements B are positioned below a distributor C which is supplied with water through the pipe 18a. From the distributor the water passes down over the outer surfaces of the elements, coming during such downward flow into intimate contact with the carbon dioxide gas within the tank. As the water passes down over the heat exchange elements B, its heat is given up to the refrigerant passing through the elements.

It seems quite unnecessary to illustrate and describe the cooling elements B with any degree of detail, since they are substantially the same in design and construction as those shown and described in United States Patent No. 2,040,947, granted May 19, 1936 to O. W. Mojonnier et al., the only differences being in dimensions. In the present case the elements are narrow and long, the length being vertical in the finished apparatus. As clearly disclosed in the patent, each of the elements B is made up of two separate oppositely embossed metal sheets, fitted together and preferably welded at meeting points to form the finished element, the same having interior passages for the flow of the refrigerant and smooth undulating outer surfaces over which the water will flow in film-like streams.

The elements B are provided with manifolds, there being in the present embodiment of the invention, two manifolds, an inlet manifold M and an outlet manifold N. These manifolds are parallel to each other and extend transversely of the planes of the elements B, and, for each element, each manifold is provided with a branch, the branches 49 being associated with the manifold M and the branches 50 with the manifold N. These branches are permanently secured to the associated elements B, as by welding. Likewise, each manifold is provided with an outwardly extending branch or nipple, the branch 51 being associated with the manifold M and the branch 52 with the manifold N. These outer branches or nipples are integral with the associated manifolds and are threaded at their outer ends for the reception of inlet and outlet pipes.

Obviously, if the elements B were to be used merely as film forming elements without performing the heat exchange function then the manifolds and their inner and outer branches would be functionally merely two supporting members, each comprising a main body extending transversely of the elements and having inner supporting branches permanently connected to their respective elements and an outer supporting branch secured to the tank wall. In such event, if desired, the supporting members might be solid structurally, without interior communicating passages. The presence of the latter, however, does not interfere with the manifolds and branches being used merely as supports.

Furthermore, it will be seen that with the manifolds (or supports) M and N thus permanently united to the treating elements B, a unitary structure is provided. This unitary structure may be made up in quantities and positioned in the tanks as required from time to time.

When it comes to placing a unitary structure of the kind just described, in the tank A, suitable openings must be provided in the wall of the latter to allow for the passage of the outer branches 51, 52 of the manifolds. In placing the treating structure in the tank, the same must be done before putting the top 17 in place. With the top out of the way, it is possible to readily lower one of these multi-element units into the tank and secure it in place. In the latter operation, the branches 51 and 52 of the manifolds M and N, respectively, are passed through the previously prepared openings in the tank wall. Then in order to firmly secure each branch in place, it is provided with a sleeve member 54 which is shouldered and threaded toward its inner end. The function of the shoulder is to press against the inner shell 12 of the tank. A nut 55 is screwed home upon the inner threaded end of the member 54 and bears against the opposite side of the shell 12 and thus insures a tight fit. The particular way of securing these branches 51, 52 by means of the members 54 and the nuts 55 may, of course, be replaced by other ways. The way shown, however, has been found very satisfactory where the multi-element unit is to be left more or less permanently in the tank. Obviously, a reversal of the structure provided by the parts 54 and 55 would permit the branches 51 and 52 to be more readily withdrawn and might be preferred in some installations where the multi-element unit is to be withdrawn from the tank A more often, for whatever purpose, cleaning or otherwise. In the structure made up as illustrated, the passing of the manifold branches 51 and 52 through the tank wall and the securing of the same in place fixedly supports the nest of heat exchange elements and at the same time provides access to their interiors for the entrance and exit of the heat exchange medium.

It will be seen that the path for the refrigerant, which ordinarily enters through the branch 51 of manifold M and departs through the branch 52 of manifold N, is a divided path, and each division is serpentine in its course. Thus, a refrigerant entering at 51 will pass through manifold M, then through the branches 49 to the associated elements B, then up through these elements in parallel and out through branches 50, manifold N and branch 52. The path through each element B will extend from the channel of branch 49 through parallel cross channels and connecting end channels formed by the opposed bulges and depressions in the constituent plates of the element. Following these bulges, the path may be traced (more particularly in Fig. 4) from branch 49, through the parallel cross channels bounded by opposing bulges 56, the end channel bounded by bulges 57, the parallel cross channels bounded by bulges 58, the end channel bounded by bulges 59, the parallel cross channels bounded by bulges 60, and so on, back and forth, until the parallel cross channels bounded by bulges 61 are encountered, then on through the end channel bounded by bulges 62, the parallel cross channels bounded by bulges 63, the end channel bounded by end bulges 64, and the parallel cross channels bounded by bulges 65, to the outlet branch 50.

The way in which the bulges and depressions are formed will be clear from a consideration of Fig. 6, wherein the top two parallel cross channels bounded by bulges 65 are shown. As there shown valleys 66 lie between the bulges or ridges, on each side of the element. Above the uppermost bulges 65, the plates come together in coplanar portions 67. Similarly, at the bottom of the element the constituent plates meet in coplanar portions 68. Likewise, along the long edges of the element, the constituent plates are brought together in coplanar portions 69 and 70. Those portions of the plates of element B which come together and contact each other, namely, those which form the valleys between the bulges and those which constitute the outer bounding edge of the element, are secured together, preferably by welding. Thus, there are coplanar portions and opposite bulging portions, and it is by securing the plates together at their coplanar portions that the element is made up.

Obviously, the paths for the refrigerant might be otherwise provided, but the structure herein illustrated has been found very satisfactory for the several uses previously indicated.

As clearly shown in Fig. 6, the bottom 71 of the distributor C is provided with a series of parallel depressions or grooves 72, arranged in pairs and each pair providing a cross sectional outline having the general form of the letter W, there being one such pair for each element B. When analyzed, it will be seen that each pair of grooves consists of a central inverted V-shaped groove and the two outer upright V-shaped grooves 72. The walls of the inverted central groove, or, put in another way, the inner walls of the outer grooves 72, have a series of openings 73 which extend through them and in position to furnish liquid to opposite sides of the associated element B. These openings 73 are preferably small holes drilled through the material and arranged in staggered relation, the holes in one wall being offset with reference to those in the other wall, as clearly shown in Fig. 5. With this arrangement, the water passing from distributor C on to elements B, takes the form of two quite evenly distributed films of substantially equal thickness, and, when once formed, these films continue in their downward flow without interruption until after they pass from the lower end of the element. The distributor C has side walls 75 and end walls 76, and rests, when in position, directly upon the upper edges of the elements B, in the manner illustrated in Fig. 6. Of course, if desired, the distributor C may be more firmly secured to the upper ends of the elements B. But, in any case, it should be possible to clean the elements B and the interior of the tank A. This means that the top 17 should be removable. In the illustrated embodiment, the associated pipes can readily be disconnected from the top and then the top can be removed from the tank proper. When the top 17 is removed, then access may be had to the distributor, the treating elements and the inner surfaces of the composite tank wall. The distributor C may be removed and cleaned. Following this, the treating elements B and the inner surfaces of the tank wall may be cleaned by using a long brush (or a long handled brush) or by pouring an acid or other cleansing solution over them. Where a brush is used, a vigorous scrubbing is desirable in order that a good job of cleaning may be done. In order to obtain the latter, the elements B are spaced a substantial distance apart and are preferably in substantially parallel relation to each other. It is thus possible to reach down into the tank between and around the elements and thoroughly scrub them as well as the interior of the tank.

In the manufacture of carbonated water, it is preferable to employ a pump 78 and to control its operation through the control of a driving electric motor 79. The pump and motor may be mounted upon the base 19, and this is the arrangement illustrated in Fig. 1. There the pump 78 rests upon the pedestal 80, and the motor 79 is carried upon the bracket 81, the motor having a pulley 82 which is located directly above the pulley 83 upon the pump. A multiple belt 84 transmits power from the motor to the pump. The latter has an intake pipe 85 which may receive its supply from any suitable source. The outlet of the pump includes a vertical pipe 86 and a horizontal pipe 87, and the vertical pipe 86 preferably has in it a check valve 88. As the pump operates, it furnishes water to the tank A through pipe 18ª. Of course, the pump and associated motor might be differently located according to the wishes of the designer.

The diagram of Fig. 7 illustrates a carbonating plant wherein the apparatus we have been describing is used. In the embodiment illustrated by the diagram, the water is to be both cooled and carbonated. Hence, it is necessary that some supply of refrigerant be available. In the present instance, a refrigerating cycle employing ammonia is illustrated. The control is what is known as a gravity control. The ammonia passes from a surge tank or drum 89 through pipe 90 to the inlet branch 51 of the treating elements B. As it travels through pipe 90, it is in liquid form, and fills the lower portions of the elements B while still in liquid form. As the ammonia takes up heat from the water which passes down over the elements B from the distributor C, it changes into a gas. It then passes out through branch 52 and pipe 91 to the surge tank 89, wherein it remains temporarily as a gas above the liquid ammonia in the lower part of the tank.

In order to keep a proper amount of ammonia in the tank 89, a float controlled valve 92 is employed in cooperation with a back pressure valve 93. The back pressure valve is connected with the upper part of tank 89 by a pipe 94 and with a compressor 95 by pipe 96. The compressor is driven by an electric motor 97 through a driving belt 98. The compressor withdraws ammonia gas through pipe 96, and after compressing it, forces it as a compressed gas through pipe 99 to the coils of a condenser 100. Cooling water is supplied to the condenser through a spray pipe 101 and after it has passed over the coils, it is collected in a pan 102 beneath the coils. From the pan 102 the used water is carried off through pipe 103 to a suitable waste outlet. As the condensed vapor is cooled within the coils of the condenser 100, it is liquefied and passes as a liquid down through pipe 104 to a receiving tank 105. From the latter it passes upward through a pipe 106 to the valve 92 which is in communication with the surge tank 89. There is pressure at all times in the pipe 99, and this pressure tends to force the liquid ammonia into the tank 89, but its entrance into said tank is controlled by the float controlled valve 92. Whenever the float 107 rises, it rocks its supporting arm 108 about its pivot 109, and, acting against the spring pressure of the spring-pressed stem 110 of the valve 92, closes the valve and prevents the passage of liquid ammonia into the tank 89. As the liquid ammonia passes out of the tank 89, and its level therein falls, the float 107 moves downward, and the stem 110 of the valve 92 is pressed upward under its spring action, and opens the valve 92 and allows liquid ammonia to enter the tank 89 from the pipe 106.

Float controlled valves and pressure regulating valves, such as the valves 92 and 93, are well known. Therefore it is quite unnecessary to illustrate the valves 92 and 93 in detail.

As illustrative of float controlled valves of the prior art, attention is called to those disclosed in the following United States patents, namely: No. 604,018, Carmichael, dated May 17, 1898; No. 1,886,468, Cornish, dated November 8, 1932; Reissue No. 18,253, Heath, dated November 17, 1931.

As illustrative of pressure controlling valves suitable for the intended use, attention is called to the valves disclosed in the following United States patents, namely:

No. 833,062, Krichbaum, dated October 9, 1906; No. 1,141,975, Osborne, dated June 8, 1915; Reissue No. 20,477, Cowin, dated August 24, 1937.

In the arrangement shown, the electric switch 38, which is controlled by the float 36 in the collecting basin of the tank A, controls a circuit for the electric motor 79 so as to operate the pump 78 whenever it is necessary to supply additional water to the tank. In the arrangement shown, it is also provided that the motor 97, which drives the compressor 95, may be continuously operated or operated under the control of the switch 38, as desired. To change from continuous operation to controlled operation, it is only necessary to change connections by throwing a manual switch 111. When the latter switch is in the full line position of Fig. 7, then the motor 97 is under the direct control of the switch 38, and, no matter which position the switch 111 is in, the pump motor 79 is under the control of the switch 38. If the hand switch 111 be thrown to the dotted line position of Fig. 7, then the motor 97 is placed in permanent circuit with the supply leads 112, 113 and is continuously operated. When the latter connection is established, the circuit from supply wire 112 extends through one arm of the switch 111 and wire 114 to one terminal of the motor 97, and the return circuit passes from the other pole of the motor 97 through wire 115 and the other arm of the switch 111, to supply lead 113.

Assuming that the hand switch 111 is in the full line position, then the circuits by which the motors 79 and 97 are controlled by the switch 38 may be readily traced. The circuit for motor 79 may be traced from supply lead 112, through conductor 40, contacts of switch 38, conductors 41 and 116 to one terminal of the motor 79, and from the other terminal of said motor, through conductors 117 and 118 to supply lead 113. Under the assumed condition of the hand switch 111, the connecting wires 114 and 115 of the motor 97 are connected respectively to wires 119 and 118, thus placing the two motors 79 and 97 in parallel and both under the control of the switch 38. Thus, with the manual switch 111 in the full line position, each closing of the switch 116 will start both motors 79 and 97, the former to supply liquid to the tank A and the latter to start the compressor 95.

Thus, with the arrangement shown in the diagram, a refrigerant is supplied to the elements B, which thereupon become cooling elements, and at the time the refrigerant is being supplied to the cooling elements, water is being forced by the pump 78 into the distributor and thence over the elements B. Thus, the water is cooled step by step as it passes down over the elements B. Preferably, as the water reaches the lower ends of the elements B, its temperature is reduced to a point just above freezing. Thus, there can be no coating of the elements or adjacent parts with ice. At the time the water is thus being progressively cooled, it is being subjected to a carbon dioxide gas supplied through pipe 31 from a tank or other suitable source of supply E. Gas is supplied under pressure and ordinarily the pressure within the tank A is anywhere from 60 to 100 pounds per square inch. And here it should be noted that, because of the substantial pressure within the tank A, it must be, and is, strong in construction, and capable of withstanding 200 or 300 pounds pressure per square inch. It is thus in fact a pressure tank. The gas admitted through inlet 32, at the tank end of the pipe 31, so fills the tank as to place the descending cooling water in an atmosphere of the gas. This means that the water, at the time it leaves the elements B, is subjected to the gas and thus becomes saturated to the highest practical degree. The water, thus impregnated, passes to the bottom of the tank and there remains, having a level indicated by the line 25 which, as it rises and falls, opens and closes the switch 38 with resulting changes in the water supply and in the water and refrigerant supplies, according to the position of the manual switch 111, as before pointed out. When the water is thus carbonated and held in the collecting basin located at the bottom of the tank A, it is in readiness for removal through pipes 16 and 43 to a filler F or like apparatus. This filler may take different forms and is here only diagrammatically shown. The pipe 33 interconnects the tank A and the upper portion of the filler F, and maintains the same pressure in both containers. In the filler the carbonated water is brought into association with syrups, or other beverage ingredients, so as to produce a suitable carbonated beverage, which may be withdrawn from the filler F through an outlet 120 and passed into bottles or like holders 121. In some instances the pipe 32 may be omitted. This would be the case if the filler F were of such construction as not to require a supply of gas under pressure from the tank A.

As illustrative of a filler requiring pressure from the carbonating tank, attention is called to United States patents as follows: No. 1,900,447, Kantor, dated March 7, 1933; No. 1,968,523, Kantor, dated July 31, 1934.

Now it is obvious that if the elements B are not to be furnished with a refrigerant, then the refrigerating equipment should be put out of service. This can be done by closing the valves 122 and 123 in the pipe connections between the surge tank 89 and the terminals of the elements B. Without furnishing a refrigerant to these elements, the water supplied by pump 78 might be water which had been previously cooled and then the function of the elements would be simply to present the water in good film formation so that there would be a good impregnation of the same by the surrounding carbonic acid gas. A valve 134 in pipe 87 serves to manually turn on or off the water supply.

In speaking of the carbonating of water, it is, of course, to be understood that the water may be that obtainable from city mains, springs or otherwise. It may also be water that is flavored or treated in special ways before being carbonated. Indeed, the carbonation should include not only these waters but also beer, wine and the like.

Likewise in practicing the invention it should be kept in mind that certain alterations and modifications in the details of the structure may be made without departing from the spirit and scope of the invention.

I claim:

1. An apparatus of the class described, comprising an enclosing tank, a plurality of flat plate-like heat exchange elements in said tank arranged in parallel spaced relation to each other and each element having an inner passage for a heat exchange medium and outer wavy surfaces for engaging the liquid to be treated, two manifolds for conducting a heat exchange medium to and from said elements, each said manifold comprising a main body and inner branches and an outer nipple, all having interior communicating passages, the main body extending transversely of said elements and adjacent to corresponding edges thereof, the branches being individual to and permanently connected with said elements and the nipple extending through the tank wall, said elements and manifolds being permanently secured together to form a unit, each transverse dimension of said unit including a nipple being smaller than the corresponding dimension of said tank whereby said unit is movable into and out of said tank, and means for securing the nipples to said wall to fixedly support said elements in said tank at a plurality of points, communication for the flow of the heat exchange medium being thereby established between said nipples by way of said elements.

2. An apparatus of the class described, comprising a vertical cylindrical enclosing tank having an open end, a nest of parallel vertical trickler heat exchange elements within said tank, said elements having interior passages for the heat exchange medium and exterior surfaces for contacting the liquid to be treated, a plurality of manifold structures each including a cylindrical body, laterally projecting pipe branches and a laterally projecting nipple, the nipple of each said structure extending outward and adapted to pass through an opening in the tank wall and the branches of each said structure extending inward in position to be permanently and operatively connected individually to the heat exchange elements, the latter connections in all cases being permanent and said branches and nipples being relatively short whereby said nest of elements and said manifold structures constitute a unit, each transverse dimension of said unit including a nipple being smaller than the diameter of said tank whereby said unit is capable of being passed into and out of said tank through its open end, and means for securing the nipples to the tank wall after being passed through the openings therein, thereby establishing a passage for the heat exchange medium between said nipples by way of the interior passages of said elements.

HARRY G. MOJONNIER.